United States Patent
Mourn

(10) Patent No.: US 9,602,302 B1
(45) Date of Patent: Mar. 21, 2017

(54) METHOD FOR DISABLING A LEGACY LOOP DETECT CIRCUIT IN A BETA NODE

(71) Applicant: Richard Mourn, Colorado Springs, CO (US)

(72) Inventor: Richard Mourn, Colorado Springs, CO (US)

(73) Assignee: DAP Holding B.U., EJ. Oldenzoal (NL)

( * ) Notice: Subject to any disclaimer, the term of this patent is extended or adjusted under 35 U.S.C. 154(b) by 304 days.

(21) Appl. No.: 14/306,557

(22) Filed: Jun. 17, 2014

(51) Int. Cl.
  *H04L 12/28* (2006.01)
  *H04L 12/40* (2006.01)

(52) U.S. Cl.
  CPC .............................. *H04L 12/40078* (2013.01)

(58) Field of Classification Search
  None
  See application file for complete search history.

(56) References Cited

U.S. PATENT DOCUMENTS

| | | | | |
|---|---|---|---|---|
| 5,509,129 A | * | 4/1996 | Guttag | G06F 7/53 708/524 |
| 6,122,248 A | * | 9/2000 | Murakoshi | G06F 13/4282 370/216 |
| 2008/0080490 A1 | * | 4/2008 | Ito | H04L 12/437 370/362 |
| 2010/0322083 A1 | * | 12/2010 | Qiang | H04L 45/18 370/248 |
| 2011/0075584 A1 | * | 3/2011 | Teramoto | H04L 12/437 370/252 |
| 2011/0261702 A1 | * | 10/2011 | Shimonishi | H04L 45/18 370/249 |

* cited by examiner

*Primary Examiner* — Kenny Lin
(74) *Attorney, Agent, or Firm* — Edwin H. Crabtree; Ramon L. Pizarro

(57) ABSTRACT

A method for disabling or removing a Legacy loop detect circuit to eliminate the circuit erroneously detecting a legacy loop during a IEEE-1394 serial bus initialization. The method includes providing a programmable code to the Legacy loop detect circuit for increasing a reset count to a value greater than three (3) to the Legacy loop circuit thus reducing the probability of an erroneous disconnect of a Beta node connection. This method provides for more robust Beta loop node operation during high frequency bus resets.

6 Claims, 3 Drawing Sheets

METHOD FOR DISABLING A LEGACY LOOP DETECT CIRCUIT IN A BETA NODE

This non-provisional patent application is based on and claims the benefit of an earlier filed provisional patent application, Ser. No. 61/837,002, filed on Jun. 19, 2013, by the subject inventor and having a title of "IEEE-1394 HIGH-PERFORMANCE SERIAL BUS DISABLE LEGACY LOOP DETECT DURING BUS INITIALIZATION".

(a) Field on Invention

This invention relates to the performance of a IEEE-1394 serial bus, and more particularly, but not by way of limitation, to a method for disabling or removing Beta node Legacy loop detect circuit. The method provides for a more robust Beta node operation during high frequency bus resets. The bus resets caused by noise events, power-up and power-down sequences and other bus reset causing events.

(b) Discussion of Prior Art

IEEE-1394-2008 defines Legacy or Alpha nodes and Beta nodes. Legacy nodes are based on earlier versions of the IEEE-1394 standard (IEEE-1394-1995 and IEEE-1394a-2000), while Beta nodes are based on IEEE-1394b-2002. There are many differences between Legacy node and Beta node implementations. For example, if Legacy nodes are connected in a loop, the nodes will continually alternate between bus reset states and a tree-id start state causing the complete bus to be non-operational until the loop is removed. Beta nodes allow loops in a topology to continue to operate normally. As defined by IEEE-1394-2008, if a cloud of Legacy nodes are connected in a loop and the loop is connected to a Beta node, the Beta node, upon detecting a fourth consecutively bus reset and tree ID oscillation, will disconnect its connection to the Legacy loop. By definition, a loop in a topology is where a node port connects back to the same node through 0 to N nodes in a node cloud.

Heretofore, there have been a number of IEEE 1394-coupled communication system and method patents. For example, they are U.S. Pat. No. 7,681,051 to Liu et al., U.S. Pat. No. 7,036,031 to Takeuchi, U.S. Pat. No. 6,912,596 to Skidmore, U.S. Pat. No. 6,523,073 to Kammer et al., and U.S. Pat. No. 6,412,076 to Honda et al. None of these patents describe the unique features and a method for specific improved robustness of Beta only bus topologies by disabling Legacy loop nodes connected to the Beta loop nodes during bus initialization.

SUMMARY OF THE INVENTION

In view of the foregoing, it is a primary object of the subject invention to eliminate disconnects in a Beta only bus topology caused by a Legacy loop detect circuit. The disconnects can be caused by noise events, power-up and power-down sequencing or other bus reset causing events. The noise events can be caused by lightning strikes, a strobe light, static electricity and the like.

Another object of the invention is to provide a programmable code for increasing a filter value to a value greater than the current value defined by IEEE-1394-2008 to reduce the probability a Legacy loop detect circuit will cause a disconnect between Beta nodes.

These and other objects of the present invention will become apparent to those familiar with different versions of Legacy node and Beta node IEEE-1394 electrical circuit technology when reviewing the following detailed description, showing novel construction, combination, and elements as described herein

DETAILED DESCRIPTION OF THE PREFERRED EMBODIMENTS

Figure 1:
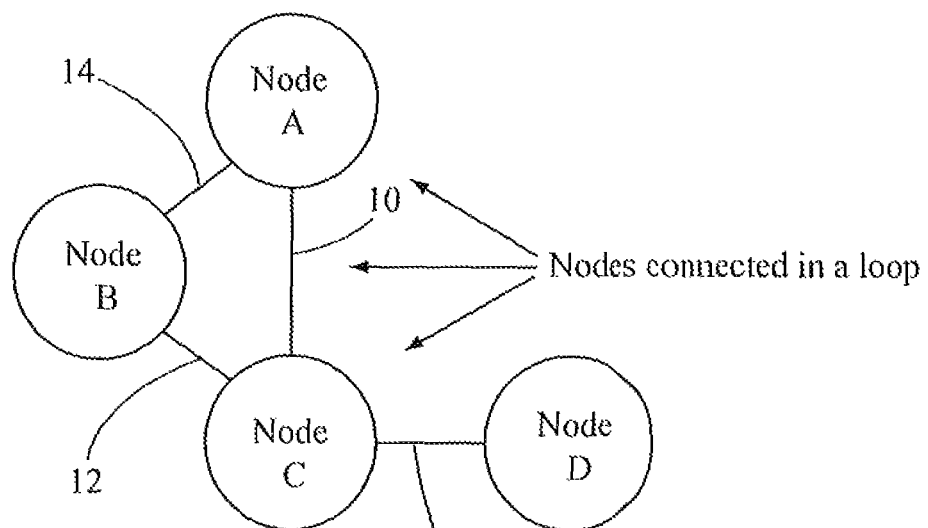
FIG. 1 illustrates Nodes A, B and C connected in a loop. Node D is shown connected as a leaf to the loop.

The accompanying drawings illustrate complete preferred embodiments in the present invention according to the practical application of the subject loop node technology, and in which:

In FIG. 1, Nodes A, B, C are shown connected in a loop via leads 10, 12 and 14. In this drawing, Node D is shown connected to Node C via lead 16, as a leaf. If Nodes A, B and C are Legacy nodes, the IEEE-1394 serial bus electrical circuit will continuously alternate between bus reset and tree-id states, which makes this serial bus non-operational. But, if Nodes D, E, and F are Beta nodes, which contain Legacy loop detect circuit, in the network, as shown in FIGS. 2 and 3, the loop is detected and logically broken and the serial bus circuit will continue to be operational.

When a Legacy group of nodes or a "Legacy Cloud" is connected to a Beta group of nodes or "Beta Cloud" and the Legacy cloud has a loop somewhere in it, the Legacy nodes in the loop will continuously alternate between bus reset and tree-id states, as defined in IEEE-1394-2008. If a Beta node is connected to the Legacy cloud and detects this situation, it will disable the connection between the Beta node and the Legacy Cloud thus allowing the Beta Cloud of nodes to continue to operate, while the Legacy Cloud continues to be non-functional.

Figure 2:
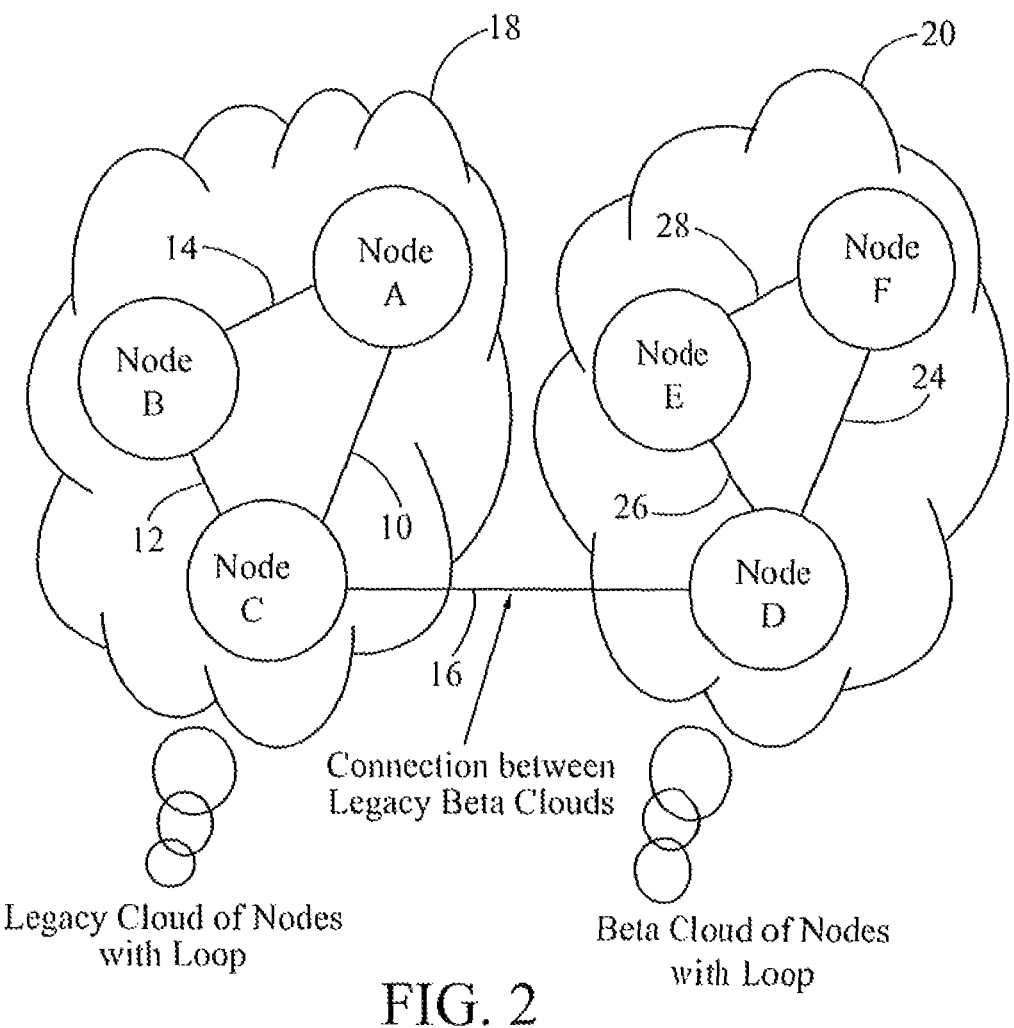
FIG. 2 illustrates a Legacy Cloud of nodes connected to a Beta Cloud of nodes.

In FIG. 2, a Legacy Cloud 18, with nodes A, B, and C, is illustrated. The Cloud 18 is connected, via lead 16, to a Beta Cloud 20 with nodes D, E and F. These cloud nodes are connected together via leads 22, 24 and 26. In this example and during bus initialization, Legacy loop detect circuit (loopDetector( )) in node D of the Beta Cloud 20 will detect that node C of the Legacy Cloud 18 never transitions out of the bus reset and tree-id states for three consecutive bus reset cycles in the circuit. This causes node D to disable its connection to node C thus allowing the Beta Cloud 20 to continue to operate normally.

Figure 3:
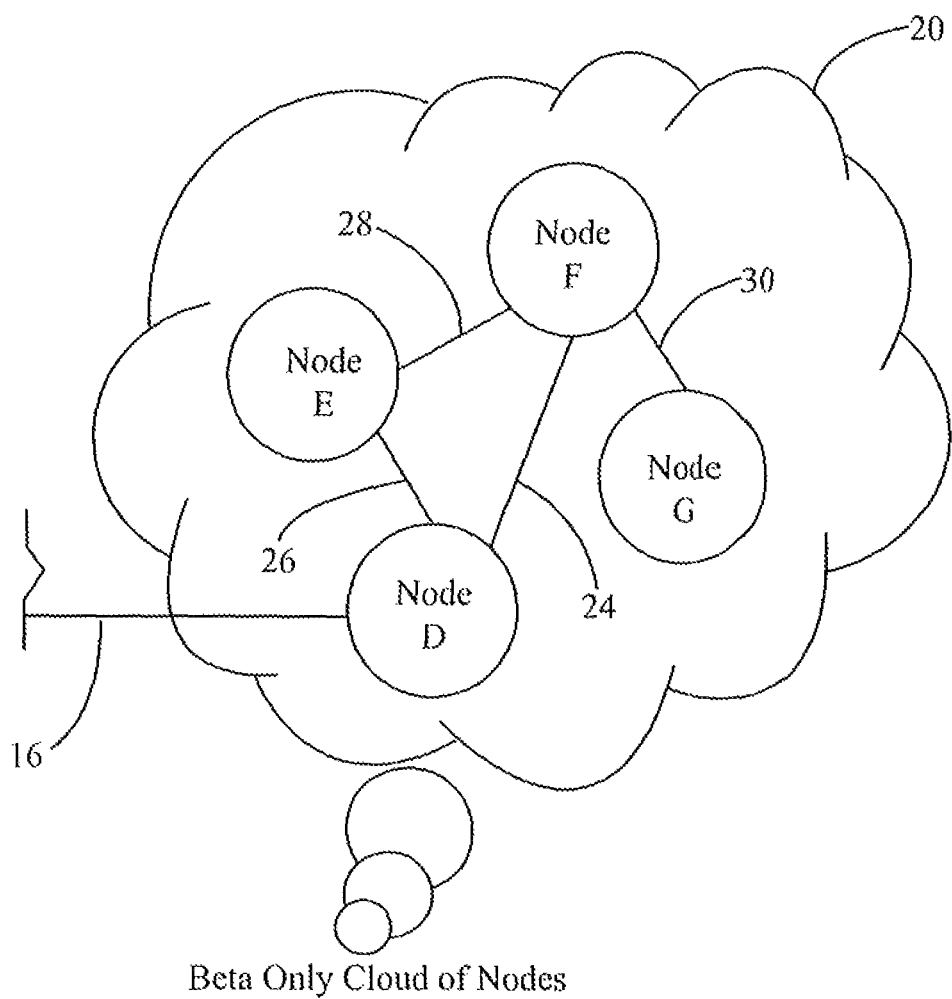
FIG. 3 illustrates the Beta Cloud of Nodes disconnected from the Legacy Cloud of nodes.

In FIG. 3, the Beta Cloud 20 is shown with nodes D, E and F. An additional node G is shown connected to loop via lead 30. In this example, the Beta Cloud 20 is shown disconnected to the Legacy Cloud 18 using the subject method for disabling the Legacy loop nodes.

While in most cases this functionality is desirable, some applications can guarantee a Legacy loop Cloud can never be created. Furthermore, in some environments it is possible that bus resets can be generated quickly enough to cause a Legacy loop detect circuit in a Beta node to incorrectly disable a connection between two different nodes. The method described herein defines how to disable or remove a Legacy loop detect circuit, as defined in loopDetector( ), thereby increasing the reliability of connections between nodes.

IEEE-1394-2008 section "14.7.13 Loop detection during bus initialization" describes the following behavior:

"Some loop conditions may be detected during bus initialization. Three conditions are explicitly treated:
  a) Configuration timeout (in the T0: Tree ID Start state), which can occur if the node is on a loop and either that loop includes one or more Legacy or Alpha nodes or the loop is formed as a result of a connection on the bus being resumed.
  b) Arbitration state timeout, which can occur up to the time when the port enters the S1: Self-ID Grant or S2: Self-ID Receive state if the node is connected to a network of Legacy or Alpha nodes that are in a loop.
  c) Repeated resets, which can occur in similar circumstances to condition b with a loop on a network that includes IEEE 1394 nodes that use a shorter arbitration state timeout."

If any of these events occur, all Beta ports are forced to commence retraining by ceasing to signal for long enough to appear disconnected and then restarting as if a new connection had been made. They enter the P11: Untested state and a loop-free build is done. A peer port treats loss of synchronization prior to entering the S1: Self-ID Grant or S2: Self-ID Receive state as an indication to move into the P11: Untested state. In the case of this condition a), it may now be possible for the tree identify process to complete normally (i.e., there is no need to restart the bus reset process). A Beta-only PHY may begin loop-free build on each port as it completes training. A border PHY, however, may not begin testing any of its Beta ports until the tree identify process completes on all Legacy or Alpha ports.

While waiting for the tree identify process to complete on active Alpha ports, the Beta ports on a border node shall complete training and enter the P11: Untested state, but shall not send an Loop Test Symbol (LTS). This prevents any attached Beta node from making its connection to this border node as a test port and trying to do an attach. The result is that the border node will not be attached to the Beta cloud until the tree identify process has successfully completed on the Legacy ports that are participating in tree identification. When the tree identify process on the Legacy ports has completed, LTS is sent on the Beta ports and a loop-free build is completed on the border node.

In the Legacy loop detect circuit, as defined by loop Detector( ) function in by IEEE-1394-2008 the behavior of a), b) and c) are described as:

```
if (T0_timeout || (maxArbStateTimeout( )) || (resetCount > 3))
void loopDetector( )
              // continuously running
int i;
if (powerReset)
{
  while (powerReset);
  return;
}
While (loopToDetect)
{           //exit from here if tree_ID is successful, possibly only after
            // the local beta ports have been put into the untested state
  if (T0_timeout || (maxArbStateTimeout( )) || (resetCount 3)
  {
           //tree_ID has detected a loop
    for i = 0; i < NPORT; i++)
      if (betaMode[i] && active[i])
      {
           // note that the transition out of active might now
             allow an exit
             from T0
```

-continued

```
           forceDisconnect[i] = TRUE;
        }
    while (loopToDetect); // only force disconnect once per each
                                 loop detection
  }
 }
}
```

The variable loopToDetect (see resetStartActions( ) function) is TRUE from start of Bus Reset up to S1: Self-ID Grant or S2: Self-ID receive state. Therefore loopToDetect is TRUE from reset start through the Tree-id process and into the Self-ID process until S1 or S2 states are entered. The resetCount (see resetStartActions( ) function) variable is incremented each time a bus reset occurs and loopToDetect is TRUE. When resetCount is greater than three (3) forceDisconnect[i]=TRUE.

In the connectionStatus( ) function if forceDisconnect is TRUE, which can be caused when a Legacy loop is detected, the P2: Active to P:11 Untested transition occurs as shown in IEEE-1394-2008 FIG. 14-2—Port connection manager state machine.
  (betaMode && loopToDetect && !bportSyncOk)||forceDisconnect
  active=FALSE;
  forceDisconnect=TRUE;
While in the untestActions( ) state if forceDisconnect is TRUE then loopDisabled is set TRUE.
  if (!rxOK||forceDisconnect)
    loopDisabled=TRUE;
which causes the P1: Untested to P12:LoopDisabled state transition to occur.

As implied in IEEE-1394-2008 section "14.7.13 Loop detection during bus initialization" this process was defined to keep Legacy loops, which cause continuous bus resets, from disturbing Beta clouds which can detect and resolve loops. However, an all Beta network may also see tightly spaced bus resets at power-up or during EMI events, thereby causing the same process to be executed. Fortunately, in an all Beta network the port doesn't stay in the LoopDisabled state rather it reconnects and becomes operational again about 500 msec after the fourth bus reset. While the 500 msec reconnect time isn't ideal, it is better than staying the LoopDisabled state.

The solution to the above LoopDisabled state is solved as follows: As indicated in IEEE-1394-2008 section "14.7.13 Loop detection during bus initialization" there are three Legacy loop detection methods:
  a) T0 timeout||
  b) maxArbStateTimeout( )
  c) ||(resetCount>3)
While only c) has been determined to cause robustness issues, all three have of the potential to cause the same disconnect behavior. Increasing the T0 timeout (CONFIG_TIMEOUT time of 166.9 µsec) or the maxArbState Timeout( ), (MAX_ARB_STATE_TIME time of 400 µsec) or the resetCount (value of 3) would decrease the probability any of these methods would erroneously detect a Legacy loop. For implementations that can guarantee Legacy loop disconnects are possible, disabling all three Legacy loop detection methods can provide additional robustness.

The method described below provides a programmable implementation that provides both backward compatibility and software/hardware programmable means to enable this new functionality. In addition to the method described below, other methods may be implemented that provide the same desired results such as; deleting the desired code, increasing resetCount to a value greater than 3 or any other implementation that effectively disables or removes the Legacy loop detect capability described in IEEE-1394-2008 section 14.7.13. The subject method as described, adds a betaOnlyOpt mode of operation. This mode is configurable through a PHY register or through hardware configuration (signal) means as follows:

A betaOnlyOpt register bit to the IEEE-1394-2008 PHY register map with the following functionality is as follows:

TABLE 1 betaOnlyOpt field description

| Field | Size | Type | Power reset value | Description |
|---|---|---|---|---|
| betaOnlyOpt | 1 | RW | See description | Is cleared or set by software to control the value of betaOnlyOpt. When set to zero the PHY layer operation includes all Alpha topology (loop detect) and connection awareness support. When set to one Robust mode is enabled and Alpha topology (loop detect) and connection awareness support is disabled. If hardware implementation-dependent means are not available to configure the power reset value of this field, the power reset value shall be zero. |

Changes to IEEE-1394-2008 Table 19-5—Variables shared between architectural elements (continued).

```
int betaOnlyOpt;    //Disable legacy loop detect capability.
int resetCount;     // count resets during this time
Changes to IEEE-1394-2008 loopDetector( ).
void loopDetector( )
{           // continuously running
  int i;
  if (powerReset)
  {
    while (powerReset);
    return;
  }
  while (loopToDetect & !betaOnlyOpt)
  {         // exit from here if tree_ID is successful, possibly only after
            // the local beta ports have been put into the untested state
    if (T0_timeout || (maxArbStateTimeout( )) || (resetCount > 3))
    {
            // tree_ID has detected a loop
      for (i = 0; i < NPORT; i++)
        if (betaMode[i] && active[i])
        {
            // note that the transition out of active might now allow
                    an exit
                from T0
            forceDisconnect[i] = TRUE;
        }
    while (loopToDetect);    // only force disconnect once per each
                                loop detection
    }
  }
}
```

Figure 4:
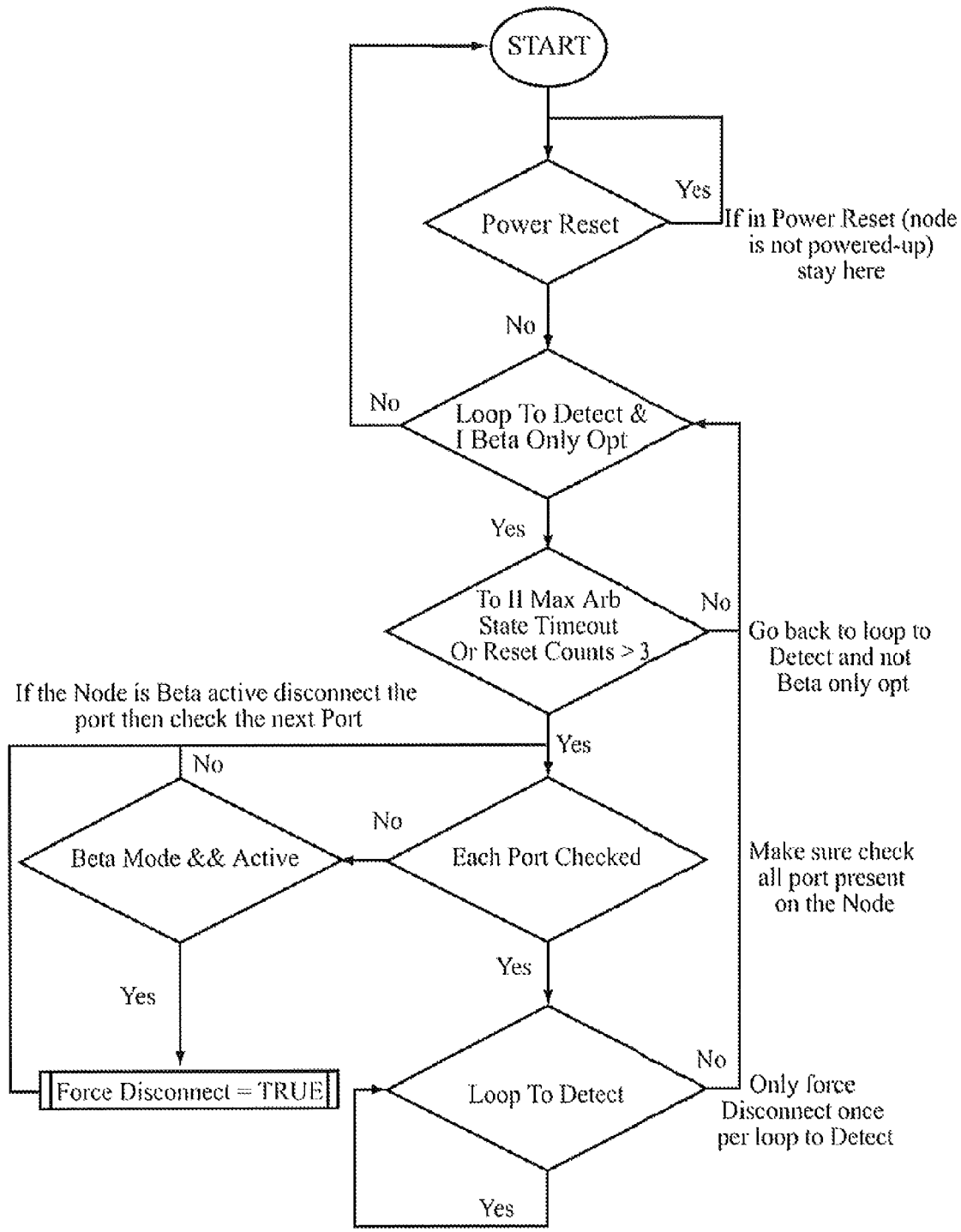
FIG. 4 illustrates a Legacy Loop Detect Circuit flow chart.

In FIG. 4, the loopDetector flowchart provides easy to read graphical representation of the loopDetector( ) c-code implementation described above. loopDector( ) is a continually running function that if betaOnlyOpt is TRUE will only evaluate the powerReset value and loop back to the beginning of loopDetector( ). If betaOnlyOpt is FALSE the rest of the code is evaluated as defined in IEEE-1394-2008.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed except as precluded by the prior art.

The embodiments of the invention for which an exclusive privilege and property right is claimed are defined as follows:

The embodiments of the invention for which an exclusive privilege and property right is claimed are defined as follows:

1. A method for disabling a Legacy loop detect circuit in a Beta node and providing a more robust Beta node operation during high frequency bus resets, the bus resets caused by a noise event, power-up and power-down sequences and other bus reset causing events, the steps comprising:
   creating a Legacy cloud with one or more Legacy nodes connected via the Legacy loop detect circuit;
   creating a Beta cloud with one or more Beta nodes connected via a Beta loop detect circuit;
   connecting the Beta loop detect circuit to the Legacy loop detect circuit;
   disabling logically the Legacy loop detect circuit from the Beta loop detect circuit when a bus reset occurs; and
   allowing the Beta cloud with one or more Beta nodes to continue to operate, while the Legacy cloud with one or more Legacy nodes continues to be non-functional.

2. The method as described in claim 1 wherein the Legacy loop detect circuit is disabled through a register field in the Legacy loop detect circuit.

3. A method for disabling a Legacy loop detect circuit in a Beta node and providing a more robust Beta node operation during high frequency bus resets, the bus resets caused by a noise event, power-up and power-down sequences and other bus reset causing events, the steps comprising:
   creating a Legacy cloud with one or more Legacy nodes connected via the Legacy loop detect circuit;
   creating a Beta cloud with one or more Beta nodes connected via a Beta loop detect circuit;
   connecting the Beta loop detect circuit to the Legacy loop detect circuit;
   removing the Legacy loop detect circuit from the Beta loop detect circuit when a bus reset occurs; and
   allowing the Beta cloud with one or more Beta nodes to continue to operate, while the Legacy cloud with one or more Legacy nodes continues to be non-functional.

4. The method as described in claim 3 wherein the Legacy loop detect circuit is disabled through a register field in the Legacy loop detect circuit.

5. A method for disabling a Legacy loop detect circuit in a Beta node and providing a more robust Beta node operation during high frequency bus resets, the bus resets caused by a noise event, power-up and power-down sequences and other bus reset causing events, the steps comprising:
   creating a Legacy cloud with one or more Legacy nodes connected via the Legacy loop detect circuit;
   creating a Beta cloud with one or more Beta nodes connected via a Beta loop detect circuit;
   connecting the Beta loop detect circuit to the Legacy loop detect circuit;
   disabling and removing the Legacy loop detect circuit from the Beta loop detect circuit when a bus reset occurs; and allowing the Beta cloud with one or more Beta nodes to continue to operate, while the Legacy cloud with one or more Legacy nodes continues to be non-functional.

6. The method as described in claim 5 wherein the Legacy loop detect circuit is disabled and removed through a register field in the Legacy loop detect circuit.

\* \* \* \* \*